(12) United States Patent
Zhang et al.

(10) Patent No.: US 12,313,183 B1
(45) Date of Patent: May 27, 2025

(54) CONTROLLER FOR ELECTROMAGNETIC VALVE, WATER TREATMENT DEVICE AND GAS COOKER

(71) Applicant: WUHU MIDEA SMART KITCHEN APPLIANCE MANUFACTURING CO., LTD., Wuhu (CN)

(72) Inventors: Shanyu Zhang, Wuhu (CN); Guanghua Li, Wuhu (CN); Feng Chen, Wuhu (CN)

(73) Assignee: WUHU MIDEA SMART KITCHEN APPLIANCE MANUFACTURING CO., LTD., Wuhu (CN)

( * ) Notice: Subject to any disclaimer, the term of this patent is extended or adjusted under 35 U.S.C. 154(b) by 0 days.

(21) Appl. No.: 18/880,504

(22) PCT Filed: Jun. 18, 2024

(86) PCT No.: PCT/CN2024/099777
§ 371 (c)(1),
(2) Date: Dec. 31, 2024

(87) PCT Pub. No.: WO2025/016132
PCT Pub. Date: Jan. 23, 2025

(30) Foreign Application Priority Data

Jul. 20, 2023 (CN) .......................... 202310894913.1

(51) Int. Cl.
*F16K 37/00* (2006.01)
*F16K 31/06* (2006.01)

(52) U.S. Cl.
CPC ...... *F16K 31/0675* (2013.01); *F16K 37/0041* (2013.01)

(58) Field of Classification Search
USPC .......... 251/129.01, 129.04, 129.05; 700/282
See application file for complete search history.

(56) References Cited

U.S. PATENT DOCUMENTS 6,507,423 B1 * 1/2003 Chen .................. H04B 10/1141
455/343.2
7,405,917 B2 * 7/2008 Ahrens ............... F16K 37/0083
324/423

(Continued)

FOREIGN PATENT DOCUMENTS

CN 102751700 A 10/2012
CN 110307379 A 10/2019

(Continued)

OTHER PUBLICATIONS

The World Intellectual Property Organization (WIPO) International Search Report and Written Opinion for PCT/CN2024/099777 Oct. 3, 2024 14 pages (including English translation).

*Primary Examiner* — Matthew W Jellett
(74) *Attorney, Agent, or Firm* — Anova Law Group, PLLC

(57) ABSTRACT

A controller for an electromagnetic valve includes a control circuit, a hysteresis circuit, and a driver circuit. An output end of the control circuit is configured to output a first wave signal of a first frequency. An input end of the hysteresis circuit is connected to the output end of the control circuit. The hysteresis circuit is configured to process the first wave signal to obtain a drive signal including a second wave signal of the first frequency and a third wave signal of a second frequency. An input end of the driver circuit is connected to an output end of the hysteresis circuit, and an output end of the driver circuit is connected to the electromagnetic valve. The driver circuit is configured to drive the electromagnetic valve to operate based on the drive signal.

10 Claims, 2 Drawing Sheets

(56) References Cited

U.S. PATENT DOCUMENTS

| | | | |
|---|---|---|---|
| 7,812,481 B2 | 10/2010 | Iisaka et al. | |
| 9,891,634 B2 * | 2/2018 | Sugimoto | G05B 19/416 |
| 2005/0212501 A1 * | 9/2005 | Acatrinei | H02M 1/4208 |
| | | | 323/283 |
| 2009/0026844 A1 | 1/2009 | Iisaka et al. | |

FOREIGN PATENT DOCUMENTS

| | | | |
|---|---|---|---|
| CN | 113685609 | A | 11/2021 |
| CN | 114962756 | A | 8/2022 |
| JP | 2019001079 | A | 1/2019 |
| JP | 6969170 | B2 | 11/2021 |

* cited by examiner

CONTROLLER FOR ELECTROMAGNETIC VALVE, WATER TREATMENT DEVICE AND GAS COOKER

CROSS-REFERENCE TO RELATED APPLICATIONS

This application is a National Stage Entry under 35 U.S.C. § 371 of International Application No. PCT/CN2024/099777, filed on Jun. 18, 2024, which claims priority to Chinese Patent Application No. 2023108949131, filed on Jul. 20, 2023 and entitled "CONTROLLER FOR ELECTROMAGNETIC VALVE, WATER TREATMENT DEVICE AND GAS COOKER," the entire contents of both of which are incorporated herein by reference.

TECHNICAL FIELD

The present disclosure relates to the technical field of circuits, and specifically relates to a controller for an electromagnetic valve, a water treatment device and a gas cooker.

BACKGROUND

The electromagnetic valve is a valve body capable of controlling an opening degree and opening/closing.

Wherein, in the control process, the control circuit outputs a square wave signal, and the driver circuit of the electromagnetic valve drives the electromagnetic valve to operate based on the square wave signal.

However, in the above-mentioned control scheme, the waveform of the hysteresis signal of the hysteresis curve of the controlled electromagnetic valve is relatively large, so that the electromagnetic valve is unable to realize linear control, and the control accuracy of the equipment where the electromagnetic valve is located relatively low.

For example, in the water heater to which the above-mentioned control scheme is applied, the waveform of the hysteresis signal of the hysteresis curve of the controlled electromagnetic valve is relatively large, so that the outlet water temperature of the water heater fluctuates suddenly, and the outlet water temperature is unstable.

SUMMARY

This application is intended to address at least one of the technical problems existing in the current technology or related technology.

In the first aspect, the present application provides a controller for an electromagnetic valve.

In the second aspect, the present application provides a water treatment device.

In the third aspect, the present application provides a gas cooker.

In view of this, in the first aspect, the present application provides a controller for an electromagnetic valve. The controller for an electromagnetic valve includes a control circuit, a hysteresis circuit and a driver circuit. An output end of the control circuit is used for outputting a first wave signal of a first frequency. An input end of the hysteresis circuit is connected to the output end of the control circuit, and the hysteresis circuit is used for processing the first wave signal of a first frequency to obtain a drive signal. The drive signal includes a second wave signal of a first frequency and a third wave signal of a second frequency. An input end of the driver circuit is connected to an output end of the hysteresis circuit, and an output end of the driver circuit is connected to the electromagnetic valve, and used for driving the electromagnetic valve to operate according to the drive signal.

In some embodiments, the first wave signal and the second wave signal are square waves, and the third wave signal is a sine wave. A first level in the second wave signal remains constant, and the waveform formed by the value of a second level in the second wave signal follows the waveform of the third wave signal.

In some embodiments, at the same time, the value of the third wave signal is a third level, the value of the second level is a fourth level, and the level value of the drive signal is the sum of the fourth level and the third level.

In some embodiments, the hysteresis circuit includes a first resistor, a second resistor, a third resistor, a first capacitor and a second capacitor. A first end of the second resistor is connected to the output end of the control circuit, and a second end of the second resistor is connected to a first end of the first resistor. A first end of the third resistor is connected to a second end of the first resistor, and a second end of the third resistor is grounded. A first end of the first capacitor is connected to the input end of the driver circuit, and a second end of the first capacitor is connected to the first end of the third resistor. A first end of the second capacitor is connected to the first end of the first resistor, and a second end of the second capacitor is connected to the second end of the third resistor.

In the second aspect, the present application provides a water treatment device, which includes an electromagnetic valve and a controller for an electromagnetic valve described above.

In some embodiments, the electromagnetic valve includes an outlet valve.

In some embodiments, the water treatment device includes a gas water heater.

In some embodiments, the electromagnetic valve includes a gas proportional valve of the gas water heater.

In the third aspect, the present application provides a gas cooker, which includes an electromagnetic valve and a controller for an electromagnetic valve described above.

In some embodiments, the electromagnetic valve includes a gas proportional valve.

The additional aspects and advantages of the present disclosure will be set forth partially in the following description, and will be apparent from the following description, or learned through the practice of the present disclosure.

BRIEF DESCRIPTION OF THE DRAWINGS

The above and/or additional aspects and advantages of the present disclosure will be obvious and easy to understand from the description of the embodiment with the following attached figures.

Figure 1:
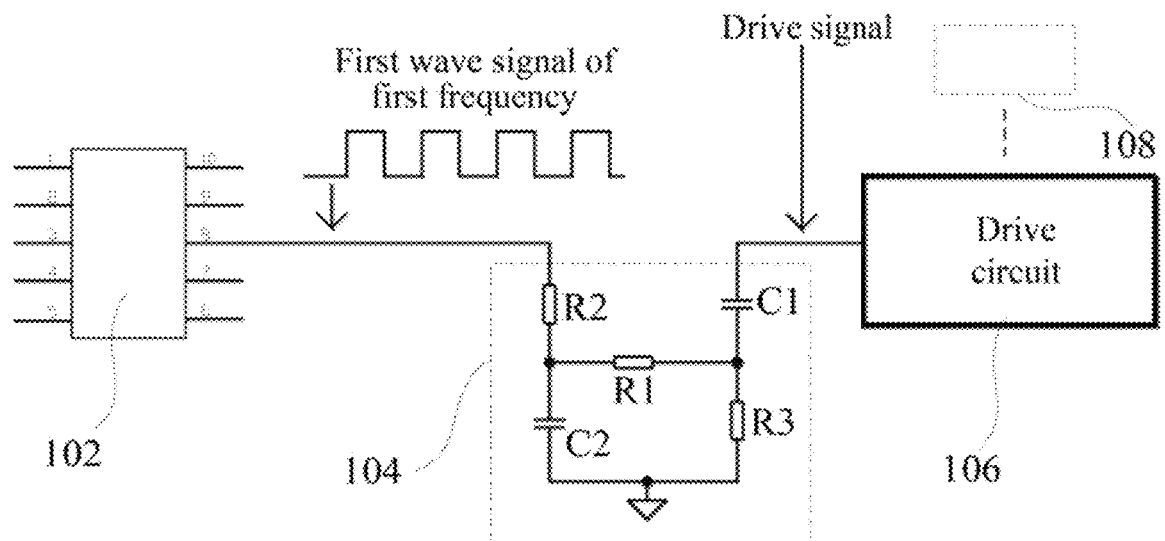
FIG. 1 illustrates a schematic topological diagram of a controller for an electromagnetic valve in embodiments of the present disclosure.

Wherein, the correspondence between reference characters and part names in FIG. 1 is as follows:

102, control circuit; 104, hysteresis circuit; 106, driver circuit; C1, first capacitor; C2, second capacitor; R1, first resistor; R2, second resistor; R3, third resistor; and 108, electromagnetic valve.

DETAILED DESCRIPTION OF THE EMBODIMENTS

In order to explain the technical solutions of the embodiments of the present application more clearly, the following will briefly introduce the accompanying drawings used in the embodiments. It is to be noted that embodiments in the present application and features in the embodiments may be combined with each other when there is no conflict.

Figure 2:
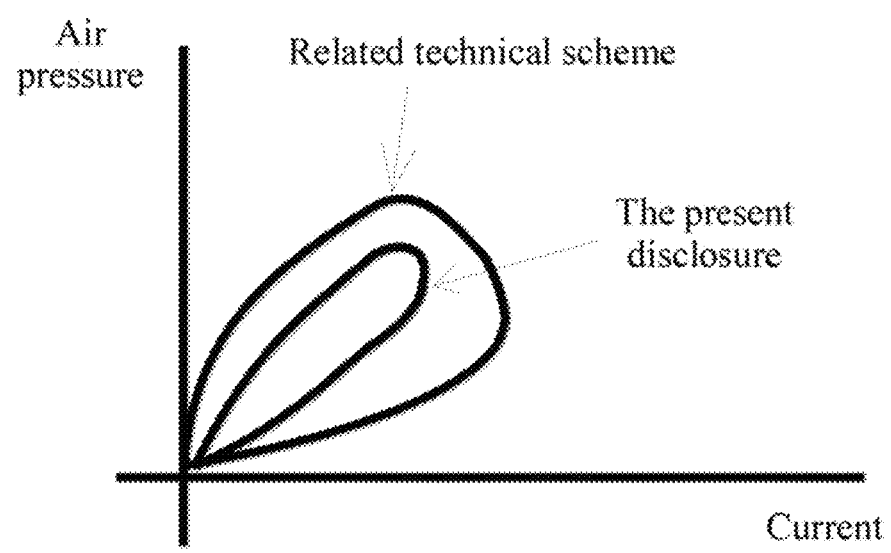
FIG. 2 illustrates a waveform comparison diagram of a hysteresis signal in a hysteresis curve in embodiments of the present disclosure and related technologies.

In one embodiment of the present disclosure, as shown in FIG. 1 and FIG. 2, a controller for an electromagnetic valve is provided. The controller for an electromagnetic valve includes a control circuit 102, a hysteresis circuit 104 and a driver circuit. An output end of the control circuit 102 is used for outputting a first wave signal of a first frequency. An input end of the hysteresis circuit 104 is connected to the output end of the control circuit 102, and the hysteresis circuit 104 is used for processing the first wave signal of a first frequency to obtain a drive signal. The drive signal includes a second wave signal of a first frequency and a third wave signal of a second frequency. An input end of the driver circuit 106 is connected to an output end of the hysteresis circuit 104, and an output end of the driver circuit 106 is connected to the electromagnetic valve 108, and the driver circuit 106 is used for driving the electromagnetic valve 108 to operate based on the drive signal.

In the embodiment, a controller for an electromagnetic valve is provided. The controller includes a control circuit 102, a hysteresis circuit 104 and a driver circuit 106.

Wherein, the control circuit 102 outputs the first wave signal of a first frequency as a control signal for driving the electromagnetic valve to operate. The first wave signal of a first frequency is processed by the provided hysteresis circuit 104, so that the drive signal is obtained, and the drive control for the electromagnetic valve is realized by the driver circuit 106 with the drive signal.

In the above-mentioned embodiment, the first wave signal of a first frequency is replaced with the drive signal to realize the updating of the control signal for driving the electromagnetic valve 108 to operate. Under the control of the drive signal, a hysteresis curve of the electromagnetic valve 108 may change.

The hysteresis curve of the electromagnetic valve is measured by an ammeter and a barometer to obtain the waveform of the hysteresis signal. As shown in FIG. 2, the waveform of the hysteresis signal in the hysteresis curve of the electromagnetic valve is noticeably reduced compared with direct adoption of the first wave signal of a first frequency to drive the driver circuit 106.

In this case, the opening degree change when the electromagnetic valve 108 is controlled is more linear, and the control is more finely controlled by the device using the above-mentioned controller for the electromagnetic valve. According to the water heater in the above-mentioned embodiment, the problem of large fluctuation of outlet water temperature may be resolved, so that the stability of outlet water temperature is improved.

In some embodiments, the hysteresis circuit 104 primarily compares an input signal to a reference signal to obtain an output signal. The working principle of the hysteresis circuit 104 is based on the principle of negative feedback. By feeding back a part of the output signal to the input end, the difference between the input signal and the reference signal is reduced, and the output signal is more stable.

In some embodiments, the hysteresis circuit 104 may be selected and constructed according to the first frequency, the first wave signal, the second frequency, the second wave signal and the third wave signal.

In some embodiments, the first frequency may be selected to be 1 KHz, or may be other frequencies, such as 1.5 KHz, or may be other frequencies, and the value of the first frequency may be determined according to actual use needs, and will not be described in detail herein.

In some embodiments, the second frequency is 100 Hz, 150 Hz, or other values.

In some embodiments, the parameters of each component in the hysteresis circuit 104 may be selected for the second frequency according to the actual usage needs, so that the third frequency that meets the needs of the user is obtained.

In some embodiments, the second frequency may be the same as the first frequency or may be different.

In some implementations, the control circuit 102 may be a control chip.

In some embodiments, the driver circuit 106 may be selected according to the controlled electromagnetic valve, and the specific selection will not be described herein.

Figure 3:
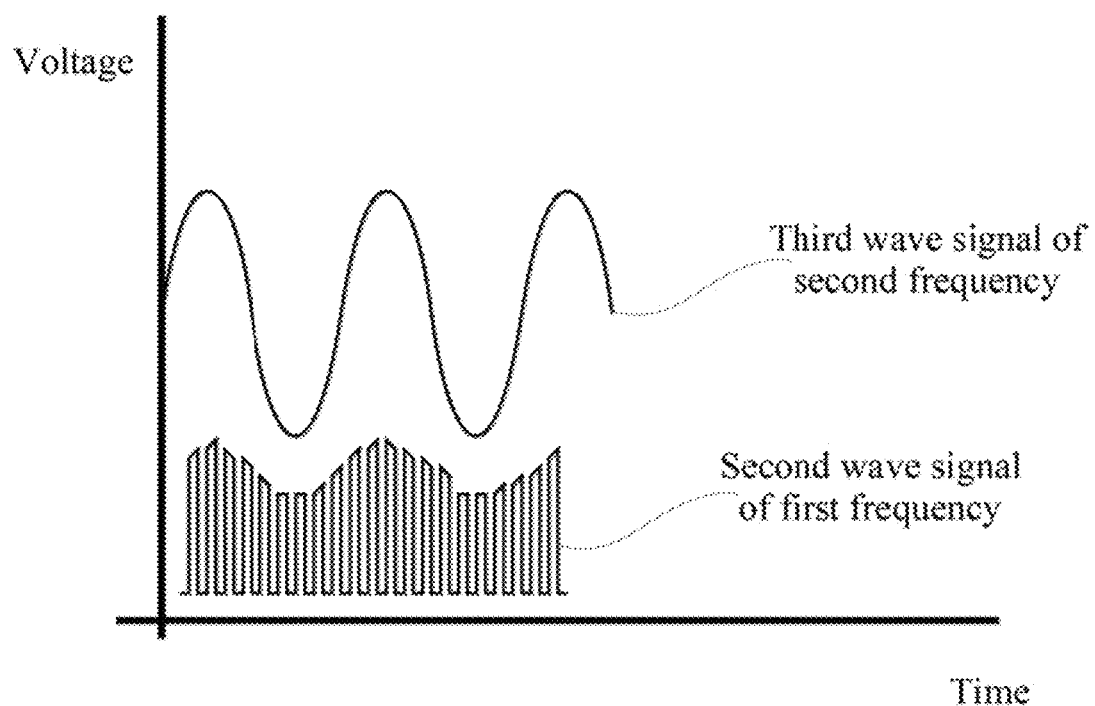
FIG. 3 illustrates a schematic diagram of a second wave signal of a first frequency and a third wave signal of a second frequency in embodiments of the present disclosure.

In some embodiments, as shown in FIG. 3, the first wave signal and the second wave signal are square waves, and the third wave signal is a sine wave; wherein, a first level in the second wave signal remains constant, and the waveform formed by the value of a second level in the second wave signal follows the waveform of the third wave signal.

Under normal circumstances, the electromagnetic valve is driven and controlled by a square wave signal. In embodiments of the present disclosure, the first wave signal and the second wave signal are defined as square waves, so that the controller for an electromagnetic valve proposed in the present disclosure may adapt to the electromagnetic valve at the current stage, so that the applicable scenarios in embodiments of the present disclosure are broadened.

In the above-mentioned embodiment, the first level is a low level of the square wave signal, and the second level is a high level of the square wave signal.

In the above-described embodiment, by defining the waveform follow, it is ensured that the drive signal may exist in the form of a periodic change, the change may be achieved by the drive signal in the case where the state of the electromagnetic valve needs to be controlled to remain unchanged.

Meanwhile, in the above-mentioned embodiment, the difficulty in controlling the electromagnetic valve may also be reduced.

In some embodiment, at the same time, the value of the third wave signal is a third level, the value of the second level is a fourth level, and the level value of the drive signal is the sum of the fourth level and the third level.

In the embodiment, the expression for the level value of the drive signal is specified. In this process, when the second wave signal of the first frequency and the third wave signal of the second frequency are determined, the drive signal may be directly calculated to realize the driving of the driver circuit 106 to realize the control of the electromagnetic valve.

In some embodiments, the hysteresis circuit 104 includes: a first resistor R1; a second resistor R2 having a first end connected to the output end of the control circuit 102, and a second end connected to a first end of the first resistor R1; a third resistor R3 having a first end connected to a second end of the first resistor R1, and a second end grounded; a first capacitor C1 having a first end connected to the input end of the driver circuit 106, and a second end connected to the first end of the third resistor R3; and a second capacitor C2 having a first end connected to the first end of the first resistor R1, and a second end connected to the second end of the third resistor R3.

In the above-mentioned embodiments, the resistance values of the first resistor R1, the second resistor R2 and the third resistor R3, and the capacitance values of the first capacitor C1 and the second capacitor C2 may be selected according to the first frequency, the first wave signal, the second frequency, the second wave signal and the third wave signal, which will not be described here.

In some embodiments, the present disclosure provides a water treatment device. The water treatment device includes an electromagnetic valve 108, and a controller for an electromagnetic valve according to any one of the above.

In the embodiment, a water treatment device is provided. The water treatment device includes the electromagnetic valve and a corresponding controller for an electromagnetic valve, wherein the controller for an electromagnetic valve includes a control circuit, a hysteresis circuit and a driver circuit.

Wherein, the control circuit outputs the first wave signal of a first frequency as a control signal for driving the electromagnetic valve to operate. The first wave signal of a first frequency is processed by the arranged hysteresis circuit, so that the drive signal is obtained. Thus, the drive control for the electromagnetic valve is realized by the driver circuit with the drive signal.

In the above-mentioned technical scheme, the first wave signal of a first frequency is replaced with the drive signal to realize the updating of the control signal for driving the electromagnetic valve to operate. Under the control of the drive signal, a hysteresis curve of the electromagnetic valve may change. The waveform of the hysteresis signal in the hysteresis curve of the electromagnetic valve is noticeably reduced compared with direct adoption of the first wave signal of a first frequency to drive the driver circuit.

In this case, the opening degree change when the electromagnetic valve is controlled is more linear, and the control is more finely controlled by the device using the above-mentioned controller for the electromagnetic valve. According to the water heater in the above-mentioned technical scheme, the problem of large fluctuation of outlet water temperature may be resolved, so that the stability of outlet water temperature is improved.

In some embodiments, the electromagnetic valve includes an outlet valve.

In the embodiment, when the electromagnetic valve is an outlet valve, the outlet valve may realize stable water outlet, fluctuations in water outlet are reduced, and then the water use experience of the user is improved.

In some embodiments, the water treatment device includes a gas water heater.

In some embodiments, the electromagnetic valve includes a gas proportional valve of the gas water heater.

In some embodiments, the electromagnetic valve may be a gas proportional valve. In this process, it is possible to ensure that the gas in the gas water heater may be stably burned, so that stable heat is provided, the problem of large fluctuation of the outlet water temperature is solved, and the stability of the outlet water temperature is improved.

In some embodiments, the present disclosure provides a gas cooker. The gas cooker includes an electromagnetic valve 108, and a controller for an electromagnetic valve according to any one of the above.

In the embodiment, a gas cooker is provided. The gas cooker includes the electromagnetic valve and a corresponding controller for an electromagnetic valve. Therefore, all beneficial technical effects of the control device for an electromagnetic valve are achieved, and will not be described herein.

In some embodiments, the electromagnetic valve 108 includes a gas proportional valve.

In some embodiments, the electromagnetic valve may be a gas proportional valve. In this process, it is possible to ensure that the gas in the gas cooker may be stably burned, so that stable heat is provided, and the cooking effect of the cooker is ensured.

In the specification and claims of the present application, features associated with "first," "second," may explicitly or implicitly include one or more of the described features. In the description of the present application, "multiple" means two or more unless explicitly specified otherwise. In addition, "and/or" in the specification and claims indicates at least one of the connected objects. The character "/" generally denotes an "or" relationship between the associated objects.

In the description of the present application, it is to be understood that azimuth or positional relationships indicated by the terms "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like are based on the azimuth or positional relationships shown in the drawings, and are for purposes of convenience only of describing the present application and simplifying the description, rather than indicating or implying that the indicated structure, device, element must have a particular orientation, be constructed and operated in a particular orientation. Therefore, these description should not be construed as limiting the present application.

In the claims, specification, and drawings of the present application, the term "multiple" refers to two or more, unless otherwise explicitly specified. Terms such as "upper," "lower," and similar directional or positional relationships are based on the orientations or positions shown in the drawings. These are provided solely for the convenience of describing the present application and simplifying the description process, and are not intended to indicate or imply that the referred devices or components must have the specific orientations, configurations, or operations described. Therefore, these descriptions should not be construed as limiting the present application. Terms such as "connect," "mount," and "fix" are to be construed broadly. For example, "connection" can be a fixed connection, a detachable connection, or an integral connection among multiple objects, and can be a direct connection among multiple objects or an indirect connection through an intermediate medium. For ordinary technical personnel in this field, the specific meanings of the above terms in present application can be understood based on specific circumstances.

In the claims, the specification and the figures attached to the specification of the present application, the description of the terms such as "one embodiment," "some embodiments" and "specific examples" indicates that specific features, structures, materials or characteristics described in connection with the embodiment or example are included in at least one embodiment or example of the present application. In the claims, specification and the figures attached to the specification of the present application, illustrative expression of the above terms does not necessarily refer to the same embodiment or example. Moreover, the described specific features, structures, materials or characteristics can be combined in any one or more embodiments or examples in a proper manner.

The above are merely example embodiments of the present application and are not intended to limit the application. For those skilled in the art, various modifications and variations can be made to this application. Any modifications, equivalent substitutions, improvements, etc., made within the spirit and principles of this application should be included within the scope of this application.

What is claimed is:

1. A controller for an electromagnetic valve comprising:
   a control circuit, an output end of the control circuit being configured to output a first wave signal of a first frequency;
   a hysteresis circuit, an input end of the hysteresis circuit being connected to the output end of the control circuit, the hysteresis circuit being configured to process the first wave signal to obtain a drive signal including a second wave signal of the first frequency and a third wave signal of a second frequency; and
   a driver circuit, an input end of the driver circuit being connected to an output end of the hysteresis circuit, an output end of the driver circuit being connected to the electromagnetic valve, and the driver circuit being configured to drive the electromagnetic valve to operate based on the drive signal.

2. The controller according to claim 1, wherein:
   the first wave signal and the second wave signal are square waves, and the third wave signal is a sine wave; and
   a first level in the second wave signal remains constant, and a waveform formed by a value of a second level in the second wave signal follows a waveform of the third wave signal.

3. The controller according to claim 2, wherein at a same time point, a value of the third wave signal is a third level, the value of the second level is a fourth level, and a level value of the drive signal is a sum of the fourth level and the third level.

4. The controller according to claim 1, wherein the hysteresis circuit includes:
   a first resistor;
   a second resistor, a first end of the second resistor being connected to the output end of the control circuit, and a second end of the second resistor being connected to a first end of the first resistor;
   a third resistor, a first end of the third resistor being connected to a second end of the first resistor, and a second end of the third resistor being grounded;
   a first capacitor, a first end of the first capacitor being connected to the input end of the driver circuit, and a second end of the first capacitor being connected to the first end of the third resistor; and
   a second capacitor, a first end of the second capacitor being connected to the first end of the first resistor, and a second end of the second capacitor being connected to the second end of the third resistor.

5. A water treatment device comprising:
   an electromagnetic valve; and
   a controller including:
      a control circuit, an output end of the control circuit being configured to output a first wave signal of a first frequency;
      a hysteresis circuit, an input end of the hysteresis circuit being connected to the output end of the control circuit, the hysteresis circuit being configured to process the first wave signal to obtain a drive signal including a second wave signal of the first frequency and a third wave signal of a second frequency; and
      a driver circuit, an input end of the driver circuit being connected to an output end of the hysteresis circuit, an output end of the driver circuit being connected to the electromagnetic valve, and the driver circuit being configured to drive the electromagnetic valve to operate based on the drive signal.

6. The water treatment device according to claim 5, wherein the electromagnetic valve includes an outlet valve.

7. The water treatment device according to claim 5, wherein the water treatment device includes a gas water heater.

8. The water treatment device according to claim 7, wherein the electromagnetic valve includes a gas proportional valve of the gas water heater.

9. A gas cooker comprising:
   an electromagnetic valve; and
   a controller including:
      a control circuit, an output end of the control circuit being configured to output a first wave signal of a first frequency;
      a hysteresis circuit, an input end of the hysteresis circuit being connected to the output end of the control circuit, the hysteresis circuit being configured to process the first wave signal to obtain a drive signal including a second wave signal of the first frequency and a third wave signal of a second frequency; and
      a driver circuit, an input end of the driver circuit being connected to an output end of the hysteresis circuit, an output end of the driver circuit being connected to the electromagnetic valve, and the driver circuit being configured to drive the electromagnetic valve to operate based on the drive signal.

10. The gas cooker according to claim 9, wherein the electromagnetic valve includes a gas proportional valve.

* * * * *